(12) United States Patent
Jainek

(10) Patent No.: US 8,057,687 B2
(45) Date of Patent: Nov. 15, 2011

(54) LIQUID FILTER HEAT EXCHANGER UNIT

(75) Inventor: Herbert Jainek, Heilbronn (DE)

(73) Assignee: Mann + Hummel GmbH, Ludwigsburg (DE)

( * ) Notice: Subject to any disclaimer, the term of this patent is extended or adjusted under 35 U.S.C. 154(b) by 421 days.

(21) Appl. No.: 11/908,290

(22) PCT Filed: Mar. 8, 2006

(86) PCT No.: PCT/EP2006/060561
§ 371 (c)(1),
(2), (4) Date: May 29, 2009

(87) PCT Pub. No.: WO2006/094996
PCT Pub. Date: Sep. 14, 2006

(65) Prior Publication Data
US 2009/0236073 A1 Sep. 24, 2009

(30) Foreign Application Priority Data
Mar. 11, 2005 (DE) .......................... 10 2005 011 221

(51) Int. Cl.
*B01D 37/00* (2006.01)
*B01D 35/147* (2006.01)
*B01D 35/02* (2006.01)

(52) U.S. Cl. .............. 210/767; 210/167.02; 210/167.06; 210/186; 210/254; 210/DIG. 17; 210/234; 165/279; 165/51; 165/119; 165/916; 236/34.5; 184/6.22; 184/6.24; 184/104.2; 123/41.33; 123/196 A; 123/196 AB

(58) Field of Classification Search .......................... None
See application file for complete search history.

(56) References Cited

U.S. PATENT DOCUMENTS

| | | | | |
|---|---|---|---|---|
| 2,591,248 A * | 4/1952 | Francois | ................... | 210/167.02 |
| 2,729,339 A * | 1/1956 | McCoy | ........................... | 210/90 |
| 4,094,791 A * | 6/1978 | Conrad | ........................ | 210/316 |
| 4,321,136 A * | 3/1982 | Matsui | ............................ | 210/86 |
| 4,615,812 A * | 10/1986 | Darling | ......................... | 210/805 |
| 4,638,856 A | 1/1987 | Yamanaka et al. | | |
| 4,906,365 A * | 3/1990 | Baumann et al. | ............. | 210/238 |
| 4,946,047 A * | 8/1990 | Kurokawa et al. | ............. | 210/234 |
| 4,948,503 A * | 8/1990 | Baumann et al. | ............. | 210/232 |
| 5,049,269 A * | 9/1991 | Shah | ............................. | 210/234 |
| 5,098,559 A * | 3/1992 | Mack et al. | ................... | 210/130 |
| 5,207,358 A * | 5/1993 | Bisker | ..................... | 222/189.06 |

(Continued)

FOREIGN PATENT DOCUMENTS
DE 19635777 A1 3/1998
(Continued)

*Primary Examiner* — Robert James Popovics

(57) ABSTRACT

A liquid filter heat exchanger unit has a heat exchanger having an inlet through which a liquid is supplied to the heat exchanger and a drain through which the liquid exits after having passed through the heat exchanger. The unit also has a liquid filter with a filter housing and a filter element exchangeably arranged in a receiving chamber, wherein the liquid is supplied through the drain of the heat exchanger to an unfiltered side of the filter element. A bypass connects an inlet passage for supplying the liquid to be filtered to the receiving chamber in the filter housing. A switching member opens and closes the bypass. The switching member is formed by the filter element such that the bypass is closed when the filter element is inserted in the filter housing and is opened when the filter element is removed from the filter housing.

6 Claims, 2 Drawing Sheets

U.S. PATENT DOCUMENTS

| | | | | |
|---|---|---|---|---|
| 5,215,655 A | * | 6/1993 | Mittermaier | 210/234 |
| 5,256,285 A | * | 10/1993 | Tomita et al. | 210/234 |
| 5,520,801 A | * | 5/1996 | Gerber et al. | 210/130 |
| 5,575,329 A | | 11/1996 | So et al. | |
| 5,698,098 A | * | 12/1997 | Ernst et al. | 210/248 |
| 5,770,065 A | * | 6/1998 | Popoff et al. | 210/232 |
| 5,814,215 A | * | 9/1998 | Bruss et al. | 210/130 |
| 5,846,417 A | * | 12/1998 | Jiang et al. | 210/235 |
| 5,858,227 A | * | 1/1999 | Stone et al. | 210/234 |
| 5,928,511 A | * | 7/1999 | Messner et al. | 210/248 |
| 6,145,752 A | * | 11/2000 | Jackson | 236/78 R |
| 6,417,758 B1 | * | 7/2002 | Russell et al. | 337/380 |
| 6,493,508 B1 | | 12/2002 | Roesgen | 392/485 |
| 6,616,838 B1 | * | 9/2003 | Harris | 210/233 |
| 6,858,134 B2 | * | 2/2005 | Yates | 210/167.01 |
| 6,896,803 B2 | * | 5/2005 | Cline et al. | 210/248 |
| 6,960,296 B2 | * | 11/2005 | Morita | 210/234 |
| 6,994,784 B2 | * | 2/2006 | Jainek | 210/149 |
| 7,000,894 B2 | * | 2/2006 | Olson et al. | 251/149.1 |
| 7,182,855 B1 | * | 2/2007 | O'Leary | 210/90 |
| 7,392,783 B2 | * | 7/2008 | Jensen et al. | 123/198 D |
| 7,682,508 B2 | * | 3/2010 | Girondi | 210/234 |
| 7,815,054 B2 | * | 10/2010 | Klein et al. | 210/418 |
| 7,820,044 B2 | * | 10/2010 | Nawa et al. | 210/232 |
| 7,842,183 B2 | * | 11/2010 | Heinz et al. | 210/235 |
| 2003/0150787 A1 | * | 8/2003 | Morita | 210/234 |
| 2004/0182566 A1 | * | 9/2004 | Jainek | 165/300 |
| 2005/0230300 A1 | * | 10/2005 | Kato | 210/234 |
| 2006/0118475 A1 | * | 6/2006 | Girondi | 210/234 |
| 2009/0236073 A1 | * | 9/2009 | Jainek | 165/51 |
| 2010/0282658 A1 | * | 11/2010 | Jungmann et al. | 210/234 |

FOREIGN PATENT DOCUMENTS

WO 0236940 A1 5/2002

* cited by examiner

LIQUID FILTER HEAT EXCHANGER UNIT

BACKGROUND OF THE INVENTION

The invention concerns a liquid filter heat exchanger unit, in particular for motor vehicles, wherein liquid is supplied to the heat exchanger by an inlet, which liquid, that after passing through the heat exchanger can be supplied through a drain of the heat exchanger to the unfiltered side of the filter element, which filter element is received in an exchangeable way in a filter housing of the liquid filter, comprising a bypass in the filter housing that connects an inlet passage for supplying the liquid to be filtered to the chamber receiving the filter element in the filter housing, wherein the bypass can be opened and closed by a switching member.

In the publication DE 102 45 005 A1 such a liquid filter heat exchanger unit is disclosed which is employed for oil cooling and oil filtering of the oil required for engine cooling. This liquid filter heat exchanger unit comprises a liquid filter with a hollow cylindrical filter element arranged in a filter housing through which the oil flows radially as well as a heat exchanger that is flanged onto the filter housing and in which the oil is cooled. The unfiltered and heated raw oil flows through an inlet passage that is provided within the filter housing first into the heat exchanger, is cooled therein, and flows out of it through an outlet opening to the unfiltered side of the filter element into a receiving chamber housing the filter element in the filter housing. The filter element is flown through radially from the exterior to the interior, subsequently the filtered raw oil flows from the filter interior axially through a drain passage out of the liquid filter heat exchanger unit and is reintroduced into the oil circulation in the engine block of the internal combustion engine.

In order to prevent clogging, in particular after a cold start, of the heat exchanger as a result of increased viscosity of the oil caused by low temperatures, a bypass branches off the inlet passage in the filter element and is connected immediately with the receiving chamber in the area of the unfiltered side of the filter element. This bypass in regular operation in which the raw oil has already reached operating temperature is closed off by a switching member embodied as a bi-metal element or a bypass valve in order to prevent direct flow of heated raw oil to the unfiltered side of the filter element by bypassing the exchanger and to guide the oil through the heat exchanger. At low temperatures however the switching member is automatically opened so that the bypass is open and the unfiltered oil can flow directly to the unfiltered side of the filter element. In this way, the heat exchanger is circumvented and an excessive pressure buildup in the lubricant circulation is prevented.

When, independent of the current temperature, the oil is to be drained from the liquid filter heat exchanger unit, for example, in order to perform an oil change, it must be ensured that only a residual volume of oil as small as possible remains within the filter or the heat exchanger.

It is an object of the invention to configure a liquid filter heat exchanger unit with constructively simple measures in such a way that a drainage as much as possible of liquid from the heat exchanger is enabled independent of the temperature.

SUMMARY OF THE INVENTION

This object is solved in accordance with the invention in that the switching member is formed by the filter element in such away that the bypass, when the filter element is inserted into the filter housing, is closed and, when the filter element is removed from the filter housing, the bypass is opened.

In the liquid filter heat exchanger unit according to the invention the switching member by means of which the bypass between the inlet in the filter housing and the unfiltered side of the filter element is to be opened or closed is formed by the filter element itself. This is done such that the bypass is closed as long as the filter element is inserted in the filter housing and is in its operating or functional position. As soon as the filter element is removed from the filter housing and thus leaves its functional position, the bypass is opened so that an immediate passage of raw oil from the inlet to the unfiltered side is possible. From the unfiltered side, the oil can be drained directly from the filter housing when the filter element is removed.

When the bypass is moved by removal of the filter element into its open position, the liquid that remained within the heat exchanger can return, because of the hydrostatic pressure difference, in the direction of the inlet and can be guided through the bypass to the unfiltered side. This has the result that practically the entire liquid that remained in the heat exchanger can be drained from it as soon as the filter element is being removed. The filter element itself provides the switching member for opening and closing the bypass opening. In order to ensure emptying of the heat exchanger as complete as possible, the bypass expediently extends approximately at the level or below the inlet opening between the inlet passage in the filter housing and the heat exchanger.

In an advantageous embodiment the inlet passage in the filter housing is connected immediately to the bypass. In this embodiment, after removal of the filter element from the filter housing the liquid that remained within the heat exchanger returns through the inlet opening into the inlet passage and from the latter via the bypass to the unfiltered side of the filter element.

In an alternative embodiment it can also be expedient that the bypass extends between the heat exchanger and the unfiltered side of the filter element wherein the mouth side of the bypass at the side of the heat exchanger is advantageously arranged immediately adjacent to the inlet opening in the heat exchanger so that the liquid introduced into the heat exchanger can be drained before the cooling unit of the heat exchanger, as needed. In this embodiment, after removal of the filter element the liquid flows from the heat exchanger directly through the bypass into the chamber receiving the filter element in the filter housing. The inlet passage communicates in this case by means of the inlet opening in the heat exchanger with the bypass.

In principle, it is sufficient that the bypass opening at the filter side is closed by the filter element itself. This is an especially simple and expedient embodiment wherein preferably the outer wall of a terminal disk at the end face of the filter element rests against the bypass opening and closes it off. The bypass opening is released automatically as soon as the filter element is removed from the receiving chamber in the filter housing.

However, possible is also an interaction between the filter element as the switching member and a closure element that is arranged at one of the openings of the bypass or within the bypass. In this embodiment, the movement of the filter element opens or closes the bypass indirectly.

Such a closure element that can be positioned in particular at the bypass opening facing the filter element is embodied in an exemplary fashion as a closure clip that is moveable between an opening position and a closing position and expediently is pretensioned in the direction of its opening position but is loaded by the inserted filter element into the closing position. When the filter element is removed, the closure element moves automatically under the action of its inherent tension into the opening position so that the bypass is released. Upon insertion of the filter element into the receiving chamber the closure element closes again.

The closure element can be located on the side of the bypass opening facing away from the filter element. Opening and closing of the closure element in this embodiment is expediently realized by utilizing the differential pressure between the heat exchanger side and the unfiltered side of the filter element. In regular operation (engine is running) the closure element which is loaded by its inherent tension in the direction of the opening position is closed by the differential pressure so that the bypass is closed off also. As soon as the engine is standing still, a pressure compensation between the heat exchanger side and the filter side is realized so that the closure element under the action of its inherent tension can open again and the bypass is released. When an oil change is carried out, the bypass is thus open while the bypass during travel is closed and no undercooled oil can flow into the filter chamber.

BRIEF DESCRIPTION OF THE DRAWINGS

Further advantages and expedient embodiments are disclosed in the further claims, the figure description and the drawings. It is shown in:

DESCRIPTION OF PREFERRED EMBODIMENTS

Figure 1:
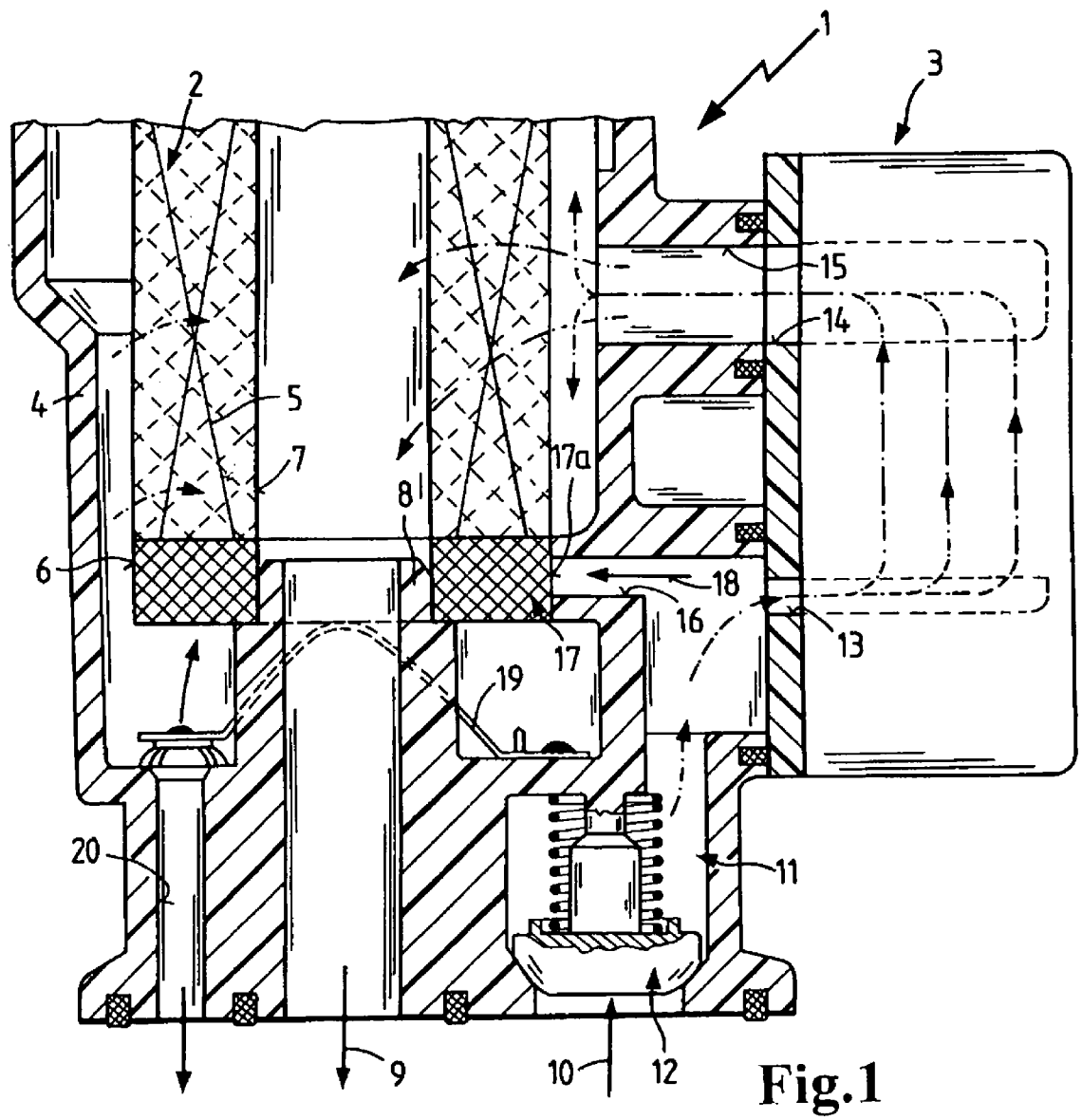
FIG. 1 a section of a liquid filter heat exchanger unit that is flanged to an engine block of an internal combustion engine for filtering and cooling oil.

The liquid filter heat exchanger unit 1 illustrated in FIG. 1 serves for cooling and cleaning motor oil or transmission oil of an internal combustion engine and comprises a liquid filter 2 and a heat exchanger 3 wherein liquid filter 2 and heat exchanger 3 are embodied as individual components but are fixedly connected to one another. The liquid filter 2 comprises a filter element 5 in a receiving chamber in a filter housing 4, which filter element is embodied as a hollow cylinder whose radial outer side forms the unfiltered side 6 though which the raw liquid to be filtered flows radially and whose cylindrical inner space forms the filtered side 7 through which the filtered liquid is removed in the axial direction. The filter element 5 is inserted into the receiving chamber in the filter housing 4 wherein the end face of the filter element is placed onto a housing socket 8 which is part of a drainage pipe for draining the filtered liquid in the direction of arrow 9. On the housing socket 8 a circumferentially extending annular shoulder is formed on which a terminal disk 17 that is fixedly connected to the end face of the filter element 5 is positive-lockingly seated.

The supply of contaminated liquid that is to the filtered is realized in the direction of arrow 10 in an inlet passage 11 formed within the filter housing 4 in which a return valve 12 is arranged for preventing unwanted return flow of liquid to be filtered in a direction opposite to the direction of arrow 10.

The inlet passage 11 communicates with an inlet opening 13 in the heat exchanger 3 adjoining laterally the filter housing 4. In regular operation—above a switching or limit temperature of the liquid or when the engine is running—the liquid to be filtered flows through the inlet passage 11 and through the inlet opening 13 into the heat exchanger 3, is cooled therein and flows subsequently through an outlet opening 14 in the upper part of the housing of the heat exchanger 3 and a connecting passage 15 in the filter housing into the outer annular space surrounding the filter element 5 and impinges radially on the unfiltered side 6 of the filter element. After passing radially through the filter element 5, the filtered and cooled liquid is drained from the liquid filter heat exchanger unit 1 through the inner filtered side 7 of the filter element and the housing socket 8 in the direction of arrow 9. The outlet opening 14 in the heat exchanger is positioned above the inlet opening 13.

From the inlet passage 11 in the filter housing 4 a bypass 16 branches off that opens directly into the annular space surrounding the filter element 5 and that constitutes at the same time the unfiltered side 6 of the filter element. In this way, the inlet passage 11 is connected directly to the unfiltered side 6 of the filter element 5 through the bypass 16, by circumventing the cooling unit in the heat exchanger 3.

However, in regular operation, i.e., with the filter element being inserted, the mouth of the bypass is closed off by the terminal disk 17 on the filter element 5. The cylindrical wall surface 17a of the terminal disk 17 adjoins immediately the bypass opening that is facing the filter element and closes it off. The bypass 16 can fill with motor oil but passage through the bypass to the unfiltered side of the filter element is prevented.

As soon as the filter element 5 is removed, the bypass opening at the filter side is also released so that the motor oil that is located in the supply passage 11 and optionally continues to flow from the heat exchanger 3 through the inlet opening 13 into the inlet passage 11, can flow in the direction of arrow 18 through the bypass 16 into the receiving chamber, in which in regular operation the filter element 5 is inserted. When at the same time the drainage passage 20 is released, which is realized by removal of the filter element 5 and the inherent tension of the closure spring 19, the motor oil can almost completely drain from the heat exchangers and the filter housing 4. In order to keep the quantity of residual oil as minimal as possible, it is recommended to keep the spacing between the inlet opening 13 and the branch of the bypass 16 as small as possible. Optionally, the bypass is positioned at the same level or lower than the inlet opening 13 which can be realized in particular in case that the bypass branches off directly from the inlet passage 11 and not from the heat exchanger 3.

At the bottom of the receiving chamber in the filter housing 4 that receives the filter element 5 the drainage passage 20 branches off; it is closable by a closure spring 19 that is loaded, when the filter element 5 is inserted, by the terminal disk 17 on the end face of the filter element axially into the closure position in which the drainage passage 20 is closed off. When the filter element 5 is however removed from the receiving chamber in the filter housing 4 the closure spring 19, as a result of its inherent tension, is moved automatically according to the direction of the arrow into the opening position and the drainage passage 20 is opened. Subsequently, the entire liquid that is still contained in the receiving chamber of the filter housing 4 can drain through the drainage passage 20. Removal of the filter element is realized when the internal combustion engine is turned off.

Figure 2:
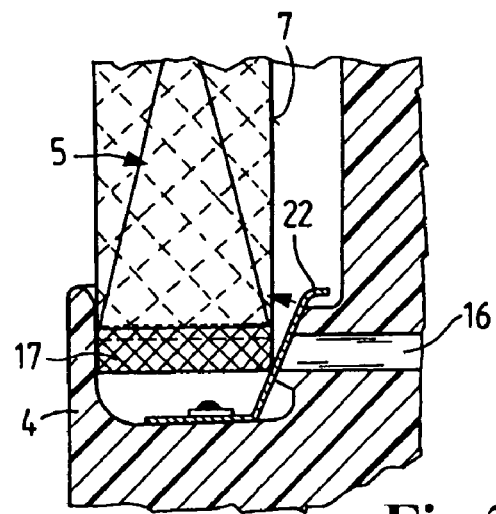
FIG. 2 a detail view with a detail of a filter element and a closure clip that closes off an opening of the bypass when the filter element is inserted.

In FIG. 2 a detail of a liquid filter heat exchanger unit is shown in a modified embodiment. The bypass 16 extending through the filter housing 4 is closed off in the area of the mouth facing the filter element 5 by a closure element 22 that is embodied as a closure clip. The closure element 22 is attached at the base of the receiving chamber for the filter element 5 by a rivet and rests seal-tightly against the mouth of the bypass 16. The inherent tension of the tension element 22 forces it into its opening position in which the bypass 16 is released. An outer edge of the terminal disk 17 that is arranged on the end face of the filter element 5 forces the closure element 22 against its inherent tension into the closing position in which the opening of the bypass 16 is fluid-tightly closed. When the filter element 5 is removed from the receiving chamber in the filter housing, loading of the closure element 22 is also eliminated so that, as a result of its inherent tension, it is pivoted automatically in the direction of the arrow into the opening position.

Figure 3:
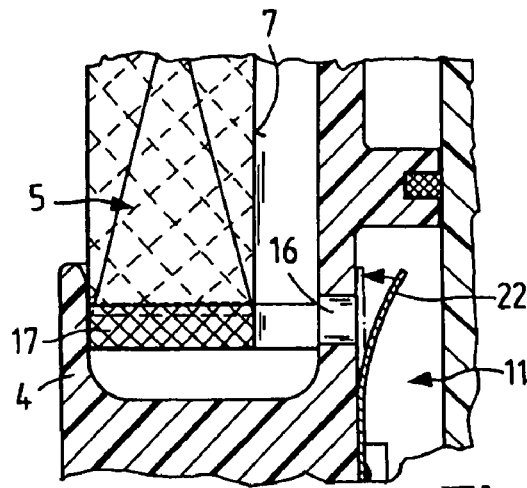
FIG. 3 a further detail illustration but with a closure element in an alternative embodiment.
Figure 4:
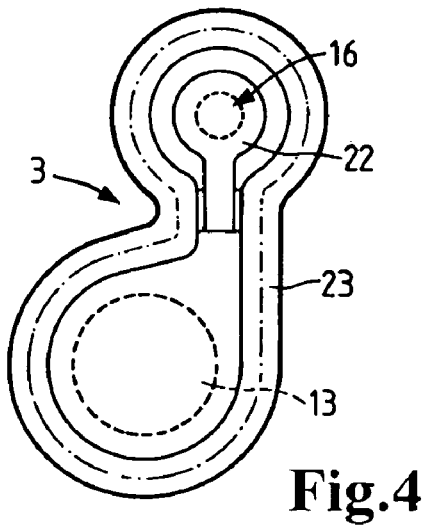
FIG. 4 a view of the end face of the heat exchanger to be flanged onto the filter housing showing the area of the inlet opening through which raw oil is supplied to the heat exchanger and of the bypass with a closure element arranged at the level of the bypass.

In FIGS. 3 and 4 a further embodiment is illustrated. The closure element 22 is located within the inlet passage 11 through which the liquid to be filtered and cooled is supplied to the liquid filter heat exchanger unit. In this embodiment, the closure element 22 is arranged on the side of the bypass 16 that is facing away from the filter element 5. By means of its inherent tension the closure element 22 is loaded into the illustrated opening position in which the bypass 16 is released. In regular operation the inlet passage 11 as well as the receiving chamber are filled with liquid in the area of the unfiltered side 6 of the filter element 5 wherein between these areas a differential pressure exists that loads the closure element 22 against its inherent tension into the closing position so that in regular operation the opening of the bypass 16 facing away from the filter element 5 is closed by the closure element 22 (illustrated in dash-dotted lines). When the motor is standing still, the closure element 22 is returned into the opening position.

FIG. 4 shows a view onto the end face of a connecting flange 23 which is a component of the housing of the heat exchanger 3 and in the mounted state is connected to the filter housing. Illustrated in dash-dotted lines is the inlet opening 13 which communicates with the inlet passage in the filter housing and shown hidden is the opening of the bypass 16 which is closed by the closure element 22. The closure element 22 is loaded by its inherent tension into the opening position and in regular operation of the internal combustion engine is loaded by the liquid pressure into the closed position.

What is claimed is:

1. Liquid filter heat exchanger unit comprising:
   a heat exchanger including
      an inlet through which a liquid is supplied to the heat exchanger and
      an outlet through which the liquid exits from the heat exchanger after having passed through the heat exchanger
   a liquid filter comprising
      a filter housing comprising
         an inlet passage receiving liquid to be filtered;
         an outlet passage for filtered liquid;
         a drainage passage for draining liquid from the filter housing for service the filter element;
         a receiving chamber; and
         a filter element exchangeably arranged in the receiving chamber,
      wherein the liquid is supplied through the outlet of the heat exchanger to the receiving chamber at an unfiltered side of the filter element;
      a bypass in the filter housing that fluidically connects the inlet passage to the receiving chamber in the filter housing;
   a switching member including
      an outer wall surface of said filter element closing over said bypass, said outer wall surface operable to close said bypass upon installation of said filter element into said filter housing, said outer wall surface operable to open said bypass upon removal of said filter element from said filter housing;
      a closure spring arranged in said filter housing, said closure spring contacting and loaded by said filter element,
      wherein interaction of said closure spring with said filter element is operable to open said drainage passage to drain liquid from said receiving chamber upon removal of said filter element from said filter housing,
      wherein interaction of said closure spring with said filter element is operable to close said drainage passage upon installation of said filter element into said filter housing.

2. Liquid filter heat exchanger unit according to claim 1, wherein
   said filter element includes a terminal end disk arranged at an end face of said filter element, and
   wherein said terminal end disk contacts and loads said contact spring.

3. Liquid filter heat exchanger unit according to claim 2, wherein
   wherein said terminal end disk rests seal-tightly against the opening of the bypass closing the bypass to liquid flow upon insertion of said filter element into said filter housing.

4. The liquid filter heat exchanger unit according to claim 3, wherein
   said closure spring includes a first end secured to said filter housing and an opposing second end operable to close or open said drainage passage,
   wherein said closure spring is inherently tensioned to automatically open said drainage passage when said filter element is removed from said filter housing,
   wherein when said filter element is installed in said filter housing said closure is loaded by contact with an end face of said filter element, said load contact overcoming said inherent tension and holding said closure spring in a closed position closing said drainage passage.

5. A method of filtering and cooling oil in a motor vehicle, comprising the step of providing a liquid filter heat exchanger unit according to claim 1.

6. The liquid filter heat exchanger unit according to claim 1, wherein
   said closure spring includes a first end secured to said filter housing and an opposing second end operable to close or open said drainage passage,
   wherein said closure spring is inherently tensioned to automatically open said drainage passage when said filter element is removed from said filter housing,
   wherein when said filter element is installed in said filter housing said closure is loaded by contact with an end face of said filter element, said load contact overcoming said inherent tension and holding said closure spring in a closed position closing said drainage passage.

* * * * *